United States Patent Office 3,836,518
Patented Sept. 17, 1974

3,836,518
CATIONIC AZO DYES FROM AMINOHALO-
BENZENESULFONAMIDES
Gary T. Clark, Kingsport, Tenn., assignor to Eastman
Kodak Company, Rochester, N.Y.
No Drawing. Filed Mar. 9, 1972, Ser. No. 233,299
Int. Cl. C09b 29/36; D06p 3/00
U.S. Cl. 260—152
9 Claims

ABSTRACT OF THE DISCLOSURE

Novel compounds of the formula

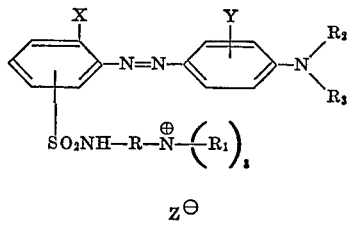

$Z^\ominus$ wherein

R represents lower alkylene;
$R_1$ represents lower alkyl, benzyl, or any equivalents thereof, and each $R_1$ may be the same or different;
$R_2$ and $R_3$ may be the same or different and each represents hydrogen, cycloalkyl, phenyl, benzyl, benzyl substituted with lower alkoxycarbonyl, lower alkyl or lower alkyl substituted with halogen, hydroxy, lower alkoxy, acyloxy, alkanoylamido, carbamoyl, succinimido, phthalimido, or
$R_2$ and $R_3$ with the nitrogen atom to which they are bonded may be combined to represent $-\overbrace{NCH_2CH_2SO_2CH_2CH_2}$ or $-\overbrace{NCH_2CH_2OCH_2CH_2}$;

Y represents hydrogen, lower alkyl, alkanoylamido, benzamido, or lower alkoxy;
X represents halogen; and
Z represents a basic dye anion.

These dyes impart fast yellow to red shades to acrylic, modacrylic, acid-modified polyester and acid-modified polyamide fibers.

This invention relates to novel cationic azo dyes and to the use of such compounds as dyes for acrylic, modacrylic, and acid-modified polyester and acid-modified polyamide textile fibers, yarns and fabrics. More particularly, this invention relates to cationic azo dyes derived from aminohalobenzenesulfonamides and selected dialkylaniline couplers. These dyes impart fast yellow to red shades to acrylic, modacrylic, acid-modified polyester and acid-modified polyamide fibers. They have particularly good properties on acrylic and acid-modified polyamide fibers.

The novel cationic compounds of this invention have the general formula:

(I)

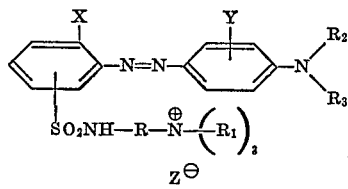

$Z^\ominus$ wherein

R represents lower alkylene;
$R_1$ represents lower alkyl, benzyl, or any equivalents thereof such as morpholino, piperidino, etc., and each $R_1$ may be the same or different;

$R_2$ and $R_3$ may be the same or different and each represents hydrogen, cycloalkyl, phenyl, benzyl, benzyl substituted with lower alkoxycarbonyl, lower alkyl or lower alkyl substituted with halogen, hydroxy, lower alkoxy, lower acyloxy, lower alkanoylamido, carbamoyl, succinimido, phthalimido, or
$R_2$ and $R_3$ with the nitrogen atom to which they are bonded may be combined to represent $-\overbrace{NCH_2CH_2SO_2CH_2CH_2}$ or $-\overbrace{NCH_2CH_2OCH_2CH_2}$;

Y represents hydrogen, lower alkyl, lower alkanoylamido, benzamido, or lower alkoxy;
X represents halogen; and
Z represents a basic dye anion.

As used herein to describe a substituent containing an alkyl moiety, the word "lower" designates a carbon content of up to about four carbon atoms.

The cationic dyes of the invention impart yellow to red shades to acrylic, modacrylic, acid-modified polyester and acid-modified polyamide fibers. These dyes give level dyeings with good exhaustion from the dye bath and good build-up properties and afford bright shades of excellent wash, perspiration, and light-fastness, which are not photochromic or prototropic (change in shade with increased acidity), and which are insensitive to pH variations.

Typical of the alkylene groups representative of R are methylene, ethylene, propylene, butylene and the like. Typical of the lower alkyl and cycloalkyl groups represented by each of $R_2$ and $R_3$ are methyl, ethyl, propyl, isobutyl, cyclopentyl, cyclohexyl, etc. Typical of the substituted lower alkyl and substituted benzyl groups represented by $R_2$ and $R_3$ are methoxyethyl, ethoxymethyl, propoxyethyl, chloroethyl, bromopropyl, acetoxy, butyryloxy, acetamido, propionamido, benzyl substituted with methoxycarbonyl, etc. Typical of the substituents represented by Z are $Cl^\ominus$, $Br^\ominus$, $I^\ominus$, $CH_3-\bigcirc-SO_3^\ominus$, $CH_3-\overset{O}{\overset{\|}{C}}-O^\ominus$, $H_2PO_4^\ominus$, $\dfrac{ZnCl_4^\ominus}{2}$, etc.

A preferred group of the novel compounds of this invention are those in which R represents lower alkylene; $R_1$ represents lower alkyl; $R_2$ and $R_3$ represents lower alkyl, phenyl, cyclohexyl, benzyl, benzyl substituted with methoxycarbonyl, or lower alkyl substituted with chlorine, bromine, methoxy, ethoxy, acetamido, carbamoyl, succinimido, phthalimido, or $R_2$ and $R_3$ may be combined with the nitrogen atom to which they are bonded to represent $-\overbrace{NCH_2CH_2SO_2CH_2CH_2}$;

Y represents hydrogen, methyl, acetamido or benzamido; X represents chlorine or bromine; and Z represents a basic dye anion.

The cationic compounds of this invention are prepared according to well-known procedures. Thus, the cationic compounds of the invention are prepared by first diazotizing an amine having the formula (II)

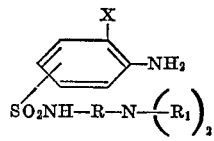

and coupling the resulting diazonium salt with compounds having the general formula (III)

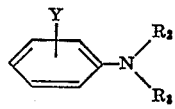

wherein R, $R_1$, $R_2$, $R_3$, X, Y, and Z are defined above, to form a monoazo compound. The amines of Formula (II) and the coupling procedures that can be used are well known in the art of dye chemistry.

The novel cationic compounds of the invention are then formed by treating the monoazo compounds described above with an alkylating agent at elevated temperature with or without an inert solvent. Suitable alkylating agents that can be used are the dialkyl sulfates, the alkyl halides, the aralkyl halides, the alkyl esters of arylsulfonic acids, etc. Examples of such alkylating agents include dimethyl sulfate, diethyl sulfate, dipropyl sulfate, ethyl bromide, methyl iodide, ethyl iodide, benzylchloride, benzylbromide, methyl p-toluene sulfonate, and ethyl benzenesulfonate.

The particular basic dye anion represented by Z will depend upon the method of isolation utilized and the particular quaternizing agent employed. The anion does not affect the utility of the cations of the invention as dyes nor does it affect the dye affinity of the cations for polyacrylonitrile textile materials. When the compounds are used to dye polyacrylonitrile textile material, the anion becomes associated with a positively-charged ion derived from the polyacrylonitrile and it is removed from the dye cation and the polyacrylonitrile textile material, either in the dye bath or in a subsequent washing of the dyed polyacrylonitrile textile material. As is well known in the art, the cation of a cationic azo dye is responsible for the color of the compound and the particular anion associated with the cation is not important.

The cationic compounds of this invention and their preparation are further illustrated by the following examples:

PREPARATION OF AMINOHALOSULFONAMIDES

Example 1.—Preparation of 3,4-dichloro-N-γ-dimethylaminopropylbenzenesulfonamide A solution of 104.1 g. (0.425 mole) of 3,4-dichlorobenzenesulfonylchloride in 300 ml. of acetone is treated with 43.0 g. (0.425 mole) of 3-dimethylaminopropylamine at 0–5° C. with stirring. After addition of the amine is completed, the reaction is allowed to attain room temperature. The resulting amine hydrochloride is collected by filtration and washed with acetone. The salt is dissolved in water and made basic with concentrated ammonium hydroxide. The free amine is collected by filtration, washed with water, and air-dried to yield 111.0 g. (84%) of 3,4-dichloro-N-γ-dimethylaminopropylbenzenesulfonamide, m.p. 91–95° C.

Example 1a.—Preparation of 4-amino-3-chloro-N-γ-dimethylaminopropylbenzenesulfonamide An autoclave is charged with 31.0 g. (0.1 mole) of 3,4-dichloro-N - γ - dimethylaminopropylbenzenesulfonamide and 180 g. of concentrated ammonium hydroxide and heated at 200° C. for 16 hrs. The product is collected by filtration and recrystallized from benzene to yield 11.0 g. 4-amino-3-chloro-N - γ - dimethylaminopropylbenzenesulfonamide, m.p. 111–115° C.

Example 2.—Preparation of 4-chloro-3-nitro-N-γ-dimethylaminopropylbenzenesulfonamide A solution of 192.0 g. (0.75 mole) of 4-chloro-3-nitrobenzenesulfonylchloride is treated with 76.6 g. (0.75 mole) of 3-dimethylaminopropylamine at 0–5° C. with stirring. The mixture is treated as described in Example 1 to give 155.0 g. of 4-chloro-3-nitro-N-γ-dimethylaminopropylbenzenesulfonamide, m.p. 95–97° C.

Example 2a—Preparation of 3-amino-4-chloro-N-γ-dimethylaminopropylbenzenesulfonamide An autoclave is charged with 70.0 g. (0.218 mole) of 4-chloro-4-nitro-N - γ - dimethylaminopropylbenzenesulfonamide, 500 ml. ethanol, 7.0 g. of 5% Pt/C, and 28 p.s.i. of hydrogen and heated at 50° C. until the uptake of hydrogen ceases. The catalyst is removed by filtration and the solvent is evaporated to yield 60.0 g. of 3-amino-4-chloro-N-γ-dimethylaminopropylbenzenesulfonamide.

Example 3

4-amino-3-chloro-N-β - dimethylaminoethylbenzenesulfonamide is prepared by substituting 2-dimethylaminoethylamine for 3-dimethylaminopropylamine in Example 1 and subsequently employing the procedure in Example 1a.

Example 4

3-amino-4-chloro-N-β - dimethylaminoethylbenzenesulfonamide is prepared by substituting 2-dimethylaminoethylamine for 3-dimethylaminopropylamine in Example 2 and by employing the procedure in Example 2a.

PREPARATION OF CATIONIC MONOAZO DYES

Example 5

A solution of 4.83 g. (0.02 mole) of 3-amino-4-chloro-N-γ-dimethylaminopropylbenzenesulfonamide (prepared in Example 2a) in 20 ml. of water containing 7 ml. of concentrated hydrochloric acid is diazotized at 0–5° C., by addition of a solution of 1.44 g. of sodium nitrite in 10 ml. of water. A portion (0.005 mole) of the above solution is added with stirring to a solution of 1.3 g. (0.005 mole) of N-ethyl-N-β-succinimido-ethyl-m-toluidine in 25 ml. of 1:5 acid (1 part propionic acid to 5 parts acetic acid) at 0–10° C. The excess acid is neutralized by the addition of ammonium acetate. After coupling is complete, the mixture is drowned in ice water and then made basic with concentrated ammonium hydroxide. The resulting monoazo compound is collected by filtration, washed with water and air dried.

Example 5a

The compound obtained from Example 5 is dissolved in 10 ml. of dimethylformamide and 3 ml. of dimethyl sulfate is added. The solution is heated on a steam bath for 1 hr. The volume is adjusted to 40 ml. by the addition of water and upon cooling the dye precipitated. The dye is collected by filtration, washed with 10% NaCl solution, and air dried to yield 2.2 g. of product. The resulting dye imparts fast orange shades to acrylic and acid-modified polyamide fibers. This dye has the following structure:

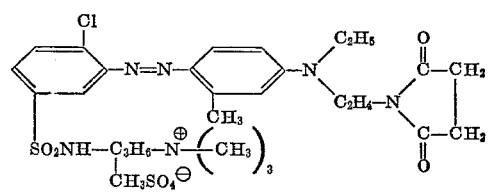

Example 6

3 - amino - 4-chloro-N-γ-dimethylaminopropylbenzenesulfonamide from Example 2a is diazotized in the same manner as described in Example 5 and coupled with (0.005 mole) of N-ethyl-N-β-succinimidoethylaniline to yield the corresponding monoazo compound.

Example 6a

The dye from Example 6 is quaternized in the same manner as described in Example 5a. The cationic dye imparts fast yellow shades to acrylic and acid-modified polyamide fibers. This dye has the following structure:

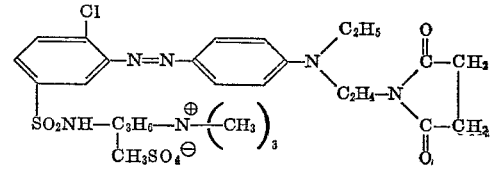

Example 7

4 - amino - 3-chloro-N-γ-dimethylaminopropylbenzenesulfonamide is diazotized in the same manner as described in Example 5 and coupled with N-ethyl-N-β-succinimidoethyl - m - acetamidoaniline to yield the corresponding monoazo compound.

Example 7a

The compound from Example 7 is quaternized in the same manner as described in Example 5a. The resulting cationic dye imparts scarlet shades to acrylic, acid-modified polyester and acid-modified polyamide fibers. This dye has the following structure:

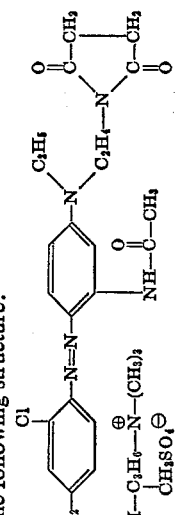

Examples 8–31

The cationic monoazo dyes set forth below are prepared according to the procedures described above or by known techniques analogous to those procedures. The colors given for the following examples of the invention refer to modified polyamide fibers dyed with these compounds.

TABLE

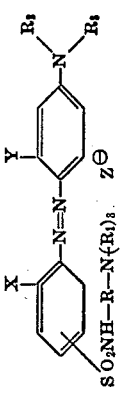

| Example | —SO$_2$—NH—(R$_1$)$_3$ relative to azo linkage | R | R$_1$ | R$_2$ | R$_3$ | X | Y | Z | Color |
|---|---|---|---|---|---|---|---|---|---|
| 8 | 3 | C$_2$H$_4$ | CH$_3$ | C$_2$H$_5$ | $_2$C$_2$H$_4$) | Cl | CH$_3$ | CH$_3$SO$_4^-$ | Orange. |
| 9 | 3 | C$_2$H$_4$ | (C$_2$H$_5$)$_2$ CH$_3$ | C$_2$H$_5$ | Same as above | Cl | H | CH$_3$SO$_4^\ominus$ | Do. |
| 10 | 4 | CH$_3$—CH—CH$_2$— | CH$_3$ | C$_2$H$_5$ | do | Cl | CH$_3$ | CH$_3$SO$_4^\ominus$ | Do. |
| 11 | 4 | —CH$_2$—CH—CH$_2$— CH$_3$ | CH$_3$ | C$_2$H$_5$ | do | Cl | CH$_3$ | CH$_3$SO$_4^\ominus$ | Do. |
| 12 | 3 | C$_2$H$_4$ | $\left(\begin{array}{c}CH_3\\-C-CH_3\\CH_3\end{array}\right)_2$ | C$_2$H$_5$ | do | Cl | H | CH$_3$SO$_4^\ominus$ | Do. |
| 13 | 3 | C$_2$H$_4$ | CH$_3$ | C$_2$H$_5$ | do | Br | CH$_3$ | CH$_3$SO$_4^\ominus$ | Do. |
| 14 | 3 | C$_2$H$_4$ | CH$_3$ | C$_2$H$_5$ | do | Cl | NHCCH$_3$ (O) | CH$_3$SO$_4^\ominus$ | Red. |
| 15 | 3 | C$_2$H$_4$ | CH$_3$ | C$_2$H$_5$ | 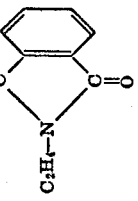 | Cl | CH$_3$ | CH$_3$SO$_4^\ominus$ | Orange. |

TABLE—Continued

| Example | −SO$_2$−NH−(R$_4$)$_n$ relative to azo linkage | R | R$_1$ | R$_2$ | R$_3$ | X | Y | Z | Color |
|---|---|---|---|---|---|---|---|---|---|
| 16 | 3 | C$_2$H$_4$ | CH$_3$ | | ⟨C$_6$H$_4$⟩SO$_2$ | Cl | CH$_3$ | CH$_3$SO$_4^\ominus$ | Yellow. |
| 17 | 4 | C$_2$H$_4$ | CH$_3$ | | Same as above | Cl | CH$_3$ | CH$_3$SO$_4^\ominus$ | Golden-yellow. |
| 18 | 3 | C$_2$H$_4$ | CH$_3$ | | do | Cl | H | CH$_3$SO$_4^\ominus$ | Yellow. |
| 19 | 3 | C$_2$H$_4$ | CH$_3$ | | do | Cl | OCH$_3$ | CH$_3$SO$_4^\ominus$ | Do. |
| 20 | 3 | C$_2$H$_4$ | CH$_3$ | C$_2$H$_5$ | C$_2$H$_5$ | Br | NHC(O)CH$_3$ | CH$_3$SO$_4^\ominus$ | Orange. |
| 21 | 4 | C$_2$H$_4$ | CH$_3$ | C$_2$H$_5$ | C$_2$H$_5$ | Cl | Same as above | CH$_3$SO$_4^\ominus$ | Red. |
| 22 | 3 | C$_2$H$_4$ | CH$_3$ | C$_2$H$_5$ | C$_2$H$_5$ | Cl | HN−C(O)−C$_6$H$_5$ | $\frac{ZnCl_4^\ominus}{2}$ | Red. |
| 23 | 3 | C$_2$H$_4$ | CH$_3$ | C$_2$H$_5$ | C$_2$H$_4$−NH−C(O)−CH$_3$ | Cl | CH$_3$ | CH$_3$SO$_4^\ominus$ | Yellow. |
| 24 | 3 | C$_2$H$_4$ | CH$_3$ | C$_2$H$_5$ | C$_2$H$_4$−NH−C(O)−NH$_2$ | Cl | CH$_3$ | CH$_3$SO$_4^\ominus$ | Do. |
| 25 | 3 | C$_2$H$_4$ | CH$_3$ | C$_2$H$_5$ | C$_2$H$_4$Cl | Cl | CH$_3$ | CH$_3$SO$_4^\ominus$ | Orange. |
| 26 | 3 | C$_2$H$_4$ | CH$_3$ | C$_2$H$_4$−O−C(O)−CH$_3$ | C$_2$H$_4$−O−C(O)−CH$_3$ | Cl | CH$_3$ | CH$_3$SO$_4^\ominus$ | Yellow. |
| 27 | 3 | C$_2$H$_4$ | CH$_3$ | CH$_3$ | CH$_3$ | Cl | CH$_3$ | CH$_3$SO$_4^\ominus$ | Do. |
| 28 | 3 | C$_2$H$_4$ | CH$_3$ | CH$_2$C$_6$H$_5$ | C$_2$H$_4$−N(C(O)CH$_3$)$_2$ | Cl | H | CH$_3$SO$_4^\ominus$ | Do. |
| 29 | 3 | C$_2$H$_4$ | CH$_3$ | | C$_2$H$_5$ | Cl | CH$_3$ | CH$_3$SO$_4^\ominus$ | Orange. |
| 30 | 3 | | CH$_3$ | CH$_2$C$_6$H$_4$−C(O)−OCH$_3$ | C$_2$H$_5$ | Cl | CH$_3$ | CH$_3$SO$_4^\ominus$ | Do. |
| 31 | 3 | | CH$_3$ | C$_2$H$_5$ | ⟨C$_6$H$_{11}$⟩ | Cl | NHC(O)−CH$_3$ | CH$_3$SO$_4^\ominus$ | Do. |

The compounds of the invention can be used for dyeing acid-modified polyamide fibers, acrylic and modacrylic polymer fibers, yarns and fabrics giving a variety of fast yellow to red shades when applied thereto by conventional dye methods. Acrylic textile materials are those which consist of at least 85 percent acrylonitrile and modacrylic textile materials are those consisting of at least 35 percent but less than 85 percent acrylonitrile. The compounds of the invention also give excellent dyeings on acid-modified acrylic fibers described in U.S. Pats. 2,837,500, 2,837,501 and 3,043,811. The novel compounds can also be used to dye sulfonate-modified polyester fibers such as are described in U.S. Pat. 3,018,272. Examples of the textile materials that are dyed with the compounds of the invention are those sold under the trade names "Orlon," "Orlon 42," "Verel," "Acrilan," "Dynel," "Creslan" and "Dacron 64." In general, the compounds, when used as dyes on the described textile materials, exhibit improved fastness, for example, to washing, to alkaline perspiration, gas (atmospheric fumes) and sublimation.

Textile materials dyed by the compounds of the invention are characterized by containing at least about 35 percent combined acrylonitrile units and up to about 95 percent acrylonitrile units, and modified, for example, by 65–5 percent of vinyl pyridine units as described in U.S. Pats. 2,990,393 and 3,014,008, or modified by 65–5 percent of vinyl pyrrolidone units, for example, as described by U.S. Pat. 2,970,783, or modified with 65–5 percent acrylic ester of acrylamide units as described in U.S. Pats. 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826, composed of a mixture of (A) 70–95 percent by weight of a copolymer of from 30–65 percent by weight of vinylidene chloride or vinyl chloride and 70–35 percent by weight of acrylonitrile, and (B) 30–5 percent by weight of a second polymer from the group consisting of (1) homopolymers of acrylamidic monomers of the formula

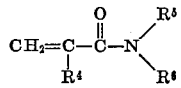

wherein $R^4$ is selected from the group consisting of hydrogen and methyl, and $R^5$ and $R^6$ are selected from the group consisting of hydrogen and alkyl groups of 1–6 carbon atoms, (2) copolymers consisting of at least two of said acrylamidic monomers, and (3) copolymers consisting of at least 50 percent by weight of at least one of said acrylamidic monomers and not more than 50 percent by weight of a polymerizable monovinyl pyridine monomer.

Another type of modacrylic polymer that can be dyed with the compounds of the invention is an acetone soluble mixture of (a) 70–95 percent by weight of a copolymer of 30–65 percent by weight of vinylidene chloride and 70–35 percent by weight of acrylonitrile and (b) 30–5 percent by weight of an acrylamide homopolymer having the above formula wherein $R^4$, $R^5$ and $R^6$ are as described above. Specific polymers of that type contain 70–95 percent by weight of (a) a copolymer of from 30–65 percent by weight of vinylidene chloride and 70–35 percent by weight of acrylonitrile and (b) 30–5 percent by weight of a lower N-alkylacrylamide polymer such as poly-N-methacrylamide, poly-N-isopropylacrylamide and poly-N-tertiarybutylacrylamide.

The following example illustrates one way in which the compounds of the invention can be used to dye acrylonitrile polymer textile material:

Example 32

An amount of 0.1 g. of dye is dissolved by warming in 5 cc. of 2-methoxyethanol. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 g. of fabric made from an acrylic fiber is entered and, in the case of "Orlon 42" acrylic textile material, the dyeing is carried out at the boil for one hour. In the case of materials made of "Verel" modacrylic fiber, the dye bath temperature should not exceed 90° C. in order to avoid damage to the fiber. The dyed material is then washed well with water and dried.

Although this invention has been described in detail with particular reference to preferred embodiments thereof, it will be understood that variations and modifications can be effected within the spirit and scope of the invention.

I claim:

1. Compounds having the structural formula

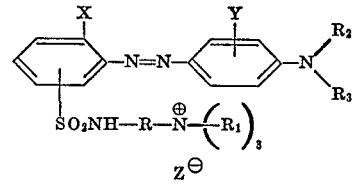

wherein

R represents lower alkylene;

$R_1$ represents lower alkyl or benzyl, and each $R_1$ may be the same or different;

$R_2$ and $R_3$ may be the same or different and each represents hydrogen, cyclopentyl, cyclohexyl, phenyl, benzyl, benzyl substituted with lower alkoxycarbonyl, lower alkyl or lower alkyl substituted with chloro, bromo, hydroxy, lower alkoxy, acetoxy, lower alkanoylamido, carbamoyl, succinimido or phthalimido, with the proviso that at least one of $R_2$ or $R_3$ represents lower alkyl substituted with succinimido or phthalimido;

Y represents hydrogen, lower alkyl, lower alkanoylamido, benzamido, or lower alkoxy;

X represents halogen; and

Z represents a basic dye anion selected from the group consisting of Cl⊖, Br⊖, I⊖, $CH_3SO_4$⊖, $ClO_4$⊖,

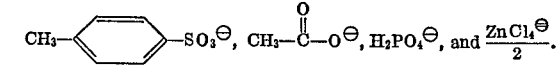

2. Compounds according to Claim 1 wherein $R_2$ represents lower alkyl, phenyl, cyclohexyl, benzyl, benzyl substituted with methoxycarbonyl, or lower alkyl substituted with chlorine, bromine, methoxy, ethoxy, lower alkanoylamido or carbamoyl;

Y represents hydrogen, methyl, acetamido or benzamido; and

X represents chlorine or bromine.

3. Compound according to Claim 2 having the formula

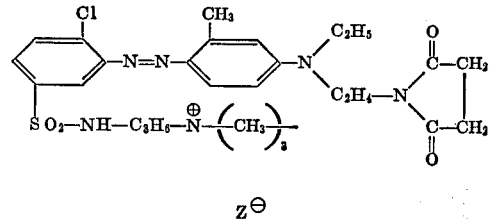

4. Compound according to Claim 2 having the formula

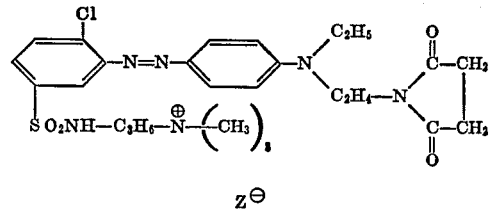

5. Compound according to Claim 2 having the formula

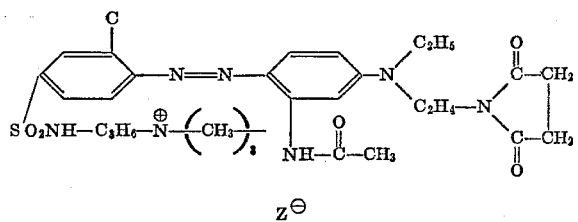

6. Compound according to Claim 2 having the formula

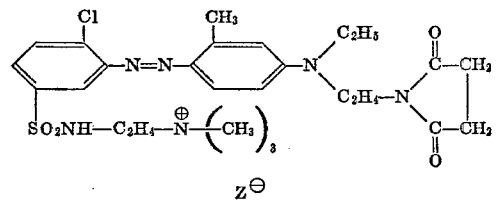

7. Compound according to Claim 2 having the formula

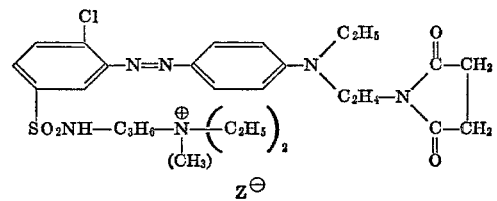

8. Compound according to Claim 2 having the formula

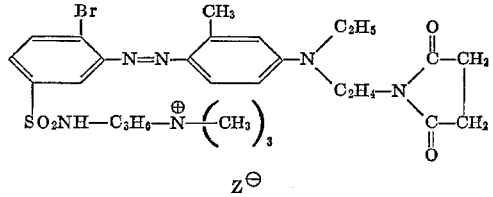

9. Compound according to Claim 2 having the formula

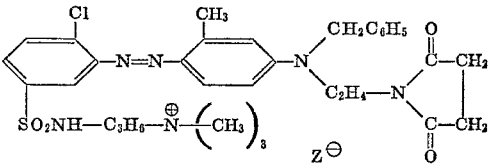

References Cited
UNITED STATES PATENTS

| | | | |
|---|---|---|---|
| 3,148,178 | 9/1964 | Wallace et al. | 260—152 |
| 3,342,799 | 9/1967 | Wallace et al. | 260—152 |
| 3,349,076 | 10/1967 | Weaver et al. | 260—152 |
| 3,386,987 | 6/1968 | Weaver et al. | 260—152 |
| 3,354,182 | 11/1967 | Kühne et al. | 260—152 X |
| 3,524,842 | 8/1970 | Grossmann et al. | 260—151 |
| 3,661,886 | 5/1972 | Heger | 260—156 |

FLOYD D. HIGEL, Primary Examiner

U.S. Cl. X.R.

8—41 R; 260—165, 207, 207.1, 556 AR, 556 B